US00RE34412E

United States Patent [19]

Elsaesser et al.

[11] E Patent Number: Re. 34,412

[45] Reissued Date of Patent: Oct. 19, 1993

[54] DISK STORAGE DRIVE HAVING MOTOR DRIVE WITH NON-CORRODIBLE HUB

[75] Inventors: Dieter Elsaesser, St. Georgen; Johann von der Heide, Schramberg, both of Fed. Rep. of Germany

[73] Assignee: Papst-Motoren GmbH & Co. KG, St. Georgen, Fed. Rep. of Germany

[21] Appl. No.: 599,516

[22] Filed: Oct. 18, 1990

Related U.S. Patent Documents

Reissue of:

[64] Patent No.: 4,779,165
Issued: Oct. 18, 1988
Appl. No.: 32,954
Filed: Mar. 31, 1987

U.S. Applications:

[63] Continuation of Ser. No. 733,231, May 10, 1985, abandoned, which is a continuation-in-part of Ser. No. 412,093, Aug. 27, 1982, abandoned.

[30] Foreign Application Priority Data

| | | | |
|---|---|---|---|
| Sep. 7, 1981 | [DE] | Fed. Rep. of Germany | 3135385 |
| Jun. 1, 1984 | [CH] | Switzerland | 2680/84 |
| Mar. 30, 1985 | [CH] | Switzerland | 01374/85 |

[51] Int. Cl.[5] ..... G11B 17/08; G11B 17/02; H02K 21/12

[52] U.S. Cl. ..... 360/99.08; 360/98.07; 310/156

[58] Field of Search ..... 360/97.01, 97.02, 97.03, 360/98.07, 99.08; 310/156

[56] References Cited

U.S. PATENT DOCUMENTS

| | | | |
|---|---|---|---|
| 4,150,406 | 4/1979 | Stollorz | 360/97 |
| 4,275,339 | 6/1981 | Burke et al. . | |
| 4,438,542 | 3/1984 | Schuh | 360/97 |
| 4,992,406 | 5/1990 | Schuh . | |

FOREIGN PATENT DOCUMENTS

| | | |
|---|---|---|
| 61-20871 | 6/1986 | Japan . |
| 8401863 | 5/1984 | PCT Int'l Appl. . |
| 1407431 | 8/1972 | United Kingdom . |
| 2032197 | 4/1980 | United Kingdom . |
| 2075240 | 11/1981 | United Kingdom . |
| 1604121 | 12/1981 | United Kingdom . |

*Primary Examiner*—A. J. Heinz
*Attorney, Agent, or Firm*—Finnegan, Henderson, Farabow, Garrett & Dunner

[57] ABSTRACT

A disk storage drive is provided with a brushless drive motor having a stator with a winding. An external rotor coaxially surrounds the stator and is spaced therefrom by a substantially cylindrical air gap. The rotor includes a permanent magnet and a soft magnetic yoke. A hub is provided that is concentric to the yoke and is connected to the rotor for rotation therewith. The hub has a disk mounting portion on its outer peripheral surface that can be passed through the central opening of a standardized storage disk for mounting the storage disks for rotation therewith. At least half of the axial longitudinal dimension of the stator winding and the rotor magnet interacting therewith is housed within the disk mounting portion of the hub. The hub is made from a non-ferromagnetic material that is suitable for storage drive clean chamber use after dimensional finishing of the hub.

69 Claims, 8 Drawing Sheets

FIG. 1
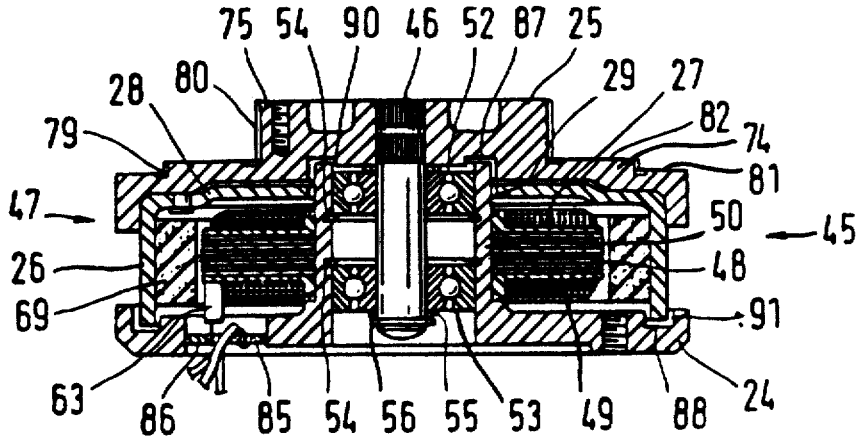
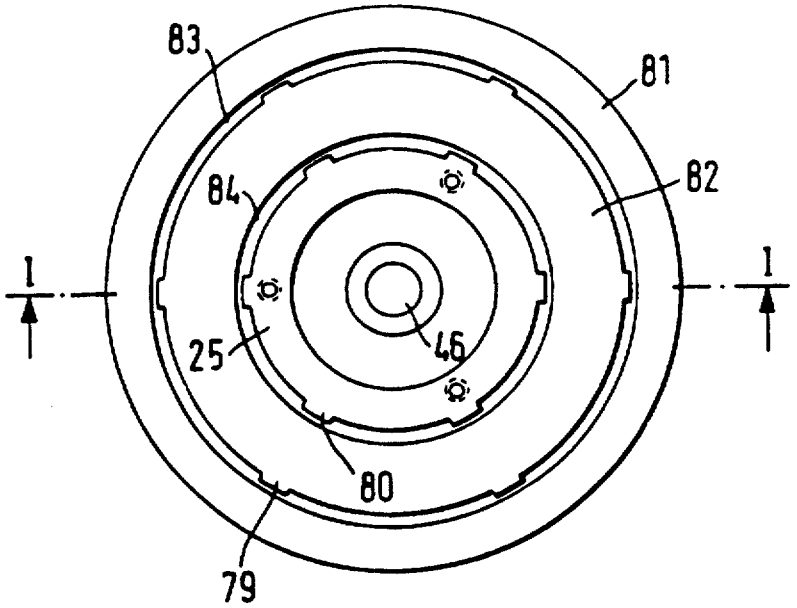
FIG. 2

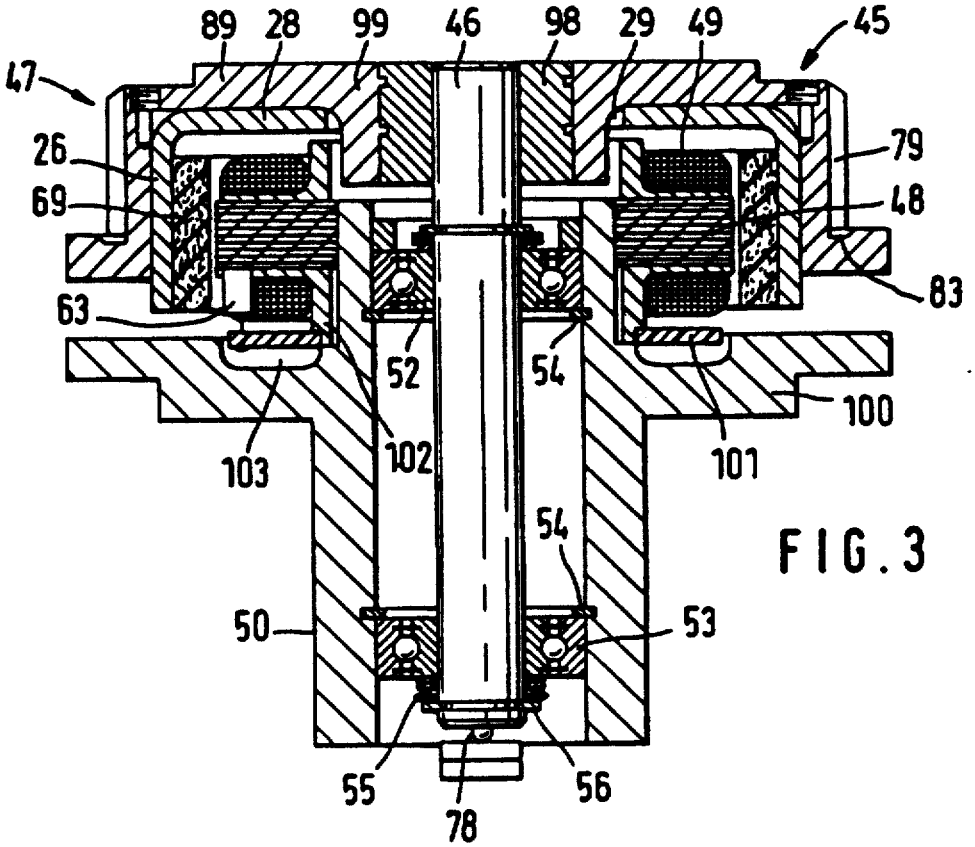
FIG. 3
FIG. 4
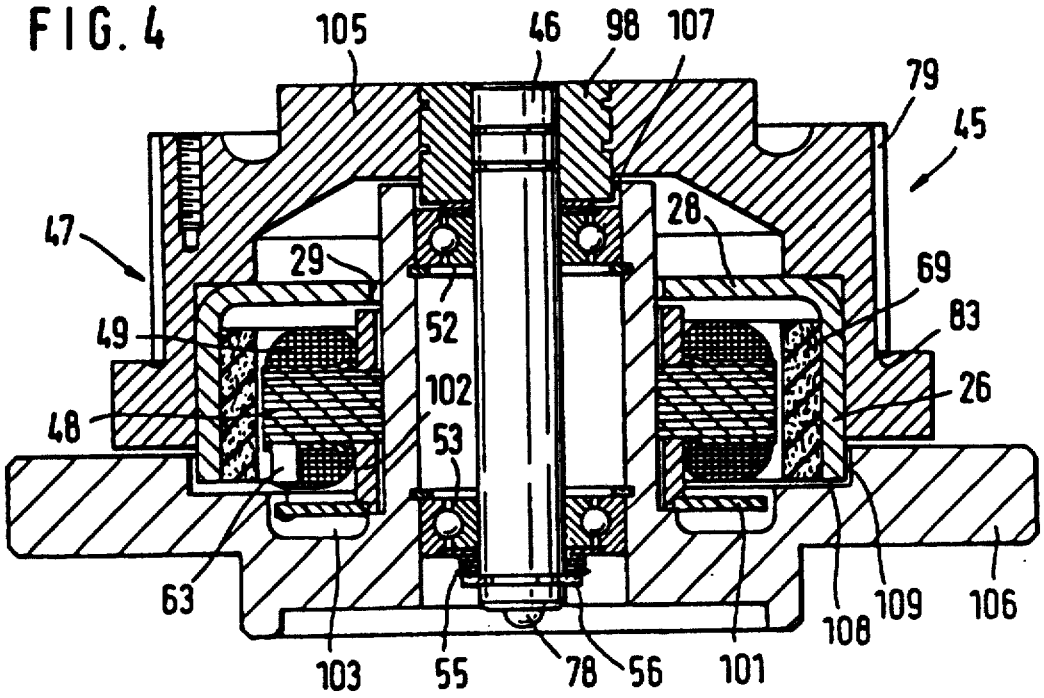

DISK STORAGE DRIVE HAVING MOTOR DRIVE WITH NON-CORRODIBLE HUB

Matter enclosed in heavy brackets [ ] appears in the original patent but forms no part of this reissue specification; matter printed in italics indicates the additions made by reissue.

This application is a continuation, of application Ser. No. 733,231 filed May 10, 1985 now abandoned which is a continuation-in-part of application Ser. No. 412,093 filed Aug. 27, 1982 and now abandoned.

*This is an application for reissue of U.S. Pat. No. 4,779,165, issued Oct. 18, 1988, entitled "DISK STORAGE DRIVE".*

BACKGROUND OF THE INVENTION

The invention relates to a disk storage drive for receiving at least one storage tank having a central opening, with an outer rotor type driving motor having a rotor casing mounted by means of a shaft in a bearing system so as to rotate relative to a stator and on which can be placed the storage disk for driving by the rotor casing, as described in U.S. patent application Ser. No. 353,584, now U.S. Pat. No. 4,438,542, issued Mar. 27, 1984.

The content of this patent is incorporated herein by reference to avoid unnecessary repetition. It relates to a disk store and storage drive for receiving at least one storage disk having a central opening. The driving motor extends coaxially at least partly through the central opening of the storage disk, and means are provided for connecting the storage disk and the driving motor rotor.

BRIEF SUMMARY OF THE INVENTION

The problem of the present invention is to further simplify the construction of a disk store described in the aforementioned U.S. Pat. No. 4,438,542, while improving its operation. In particular, the storage disk is to be reliably protected against undesired influencing by the magnetically active parts of the driving motor. In addition, a particularly space-saving and robust construction of the driving motor are to be achieved.

According to the invention, this problem is solved in that at least the part of the rotor casing receiving the storage disk is made from a non-ferromagnetic material and carries the shaft directly or by means of a hub and in that a magnetic shield made from a ferromagnetic material in the form of a drawn can projects into the storage disk receiving part of the rotor casing and is connected thereto. The shielding surrounds the periphery of the magnetically active parts of the driving motor and also envelops the parts at one end. The shield has a central opening whose edge is directly radially adjacent the shaft or parts of the driving motor carrying or supporting the shaft. A rotor casing constructed in this way can be easily manufactured, and it effectively protects the magnetically sensitive storage disks, particularly magnetic hard storage disks, against magnetic stray flux emanating from the magnetically active parts of the driving motor. The shield is preferably in the form of a deep-drawn can, and the part of the rotor casing receiving the storage disk can be made from a lightweight metal by die casting.

If, in the manner described in the aforementioned U.S. Pat. No. 4,438,542, the driving motor is constructed as a brushless direct current motor with a permanent magnet rotor, then in accordance with a further development of the invention a printed circuit board with at least one rotary position detector and perhaps other electronic components for the control and regulation of the driving motor are mounted on the side of the stator remote from the bottom of the shielding can. This ensures that the rotary position detector and any further circuit components of the magnetic shielding arrangement do not interfere with the rotating parts.

Further advantageous development of the invention also are disclosed, including features that contribute to a compact construction of the disk storage drive. In connection with disk storage drives of the present type, high demands are made on the concentricity of the storage disks. It is therefore generally necessary to machine the storage disk receiving part or to work it in some other way so that it is dimensionally true. As a result of other features of the invention, the necessary machining is reduced to a relatively small part of the circumferential surface of the storage disk receiving part and a trouble-free engagement of a storage disk on the shoulder of the storage disk receiving part is permitted.

Other features of the claimed invention provide a robust precision mounting support for utilizing the available axial overall length for maximizing the distance between the bearings; and permit particularly large distances between the bearings where the axial installation area between a mounting or assembly flange and the end of the storage disk receiving part is limited. Installation space is available on the other side of this flange. Still other features provides for alternative solutions leading to particularly small radial runouts of the rotor; ensure a space-saving housing of the circuit board; and for solutions where importance is attached to particularly shallow construction.

BRIEF DESCRIPTION OF THE DRAWINGS

The invention is described in greater detail hereinafter relative to non-limitative embodiments and the attached drawings, wherein:

FIG. 1 is a vertical partial sectional view through a first embodiment of the invention along the line I—I of FIG. 2;

FIG. 2 is a plan view of the arrangement of FIG. 1;

FIG. 3 is a sectional view through another embodiment of the invention with an extended bearing tube;

FIG. 4 is a sectional view through a further embodiment of the invention; *

DETAILED DESCRIPTION OF THE PREFERRED EMBODIMENTS

Figure 5:
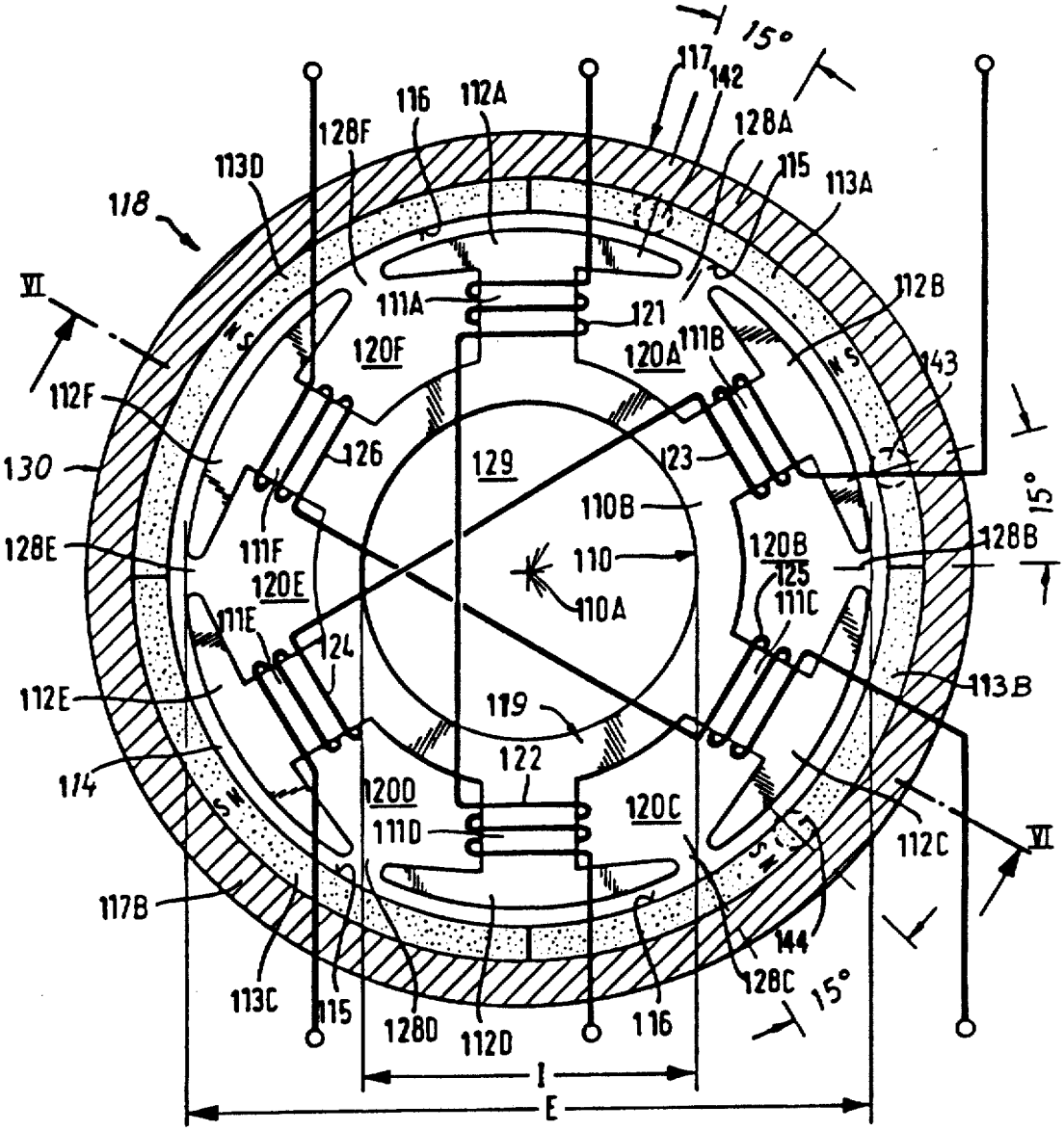
FIG. 5 is a section through a disk storage drive according to the invention along line V—V of FIG. 6.

The disk storage drive illustrated in FIG. 1, having an extremely shallow construction, has a brushless direct current motor 45 having a rotor casing 47 fixed to and coaxial with a rotor shaft 46. A stator lamination 48, carrying a stator winding 49 is mounted on a bearing tube 50. The rotor shaft 46 is rotatably mounted within the bearing tube 50 by means of two bearings 52 and 53. These are kept axially spaced by a pair of retaining rings 54. A cup spring 55 is supported on the underside of the bearing 53 by a retaining ring 56 resting on the rotary shaft 46, so that the bearing 52, 53 are axially braced relative to one another. The bearings 52, 53 are pressed into the bearing tube 50 at the time of assembly. Together with an assembly flange 24, the bearing tube 50 forms a one-piece die casting.

The rotor casing 47 comprises a storage disk receiving part 25 and a shielding can 26, which are joined together, for example, by riveting. The storage disk receiving part 25 is made from a non-ferromagnetic material, preferably lightweight metal. The rotor shaft 46 is pressed into a central opening of the storage disk receiving part 25. As alternative, the shaft can be cast into the receiving part.

The shielding can 26 is made from a ferromagnetic material and can in particular be constructed as a soft iron deep-drawn part. A plurality of permanent magnetic segments or a one-part permanent magnet 69 are fixed to the inner face of shielding can 26 radially facing the stator lamination 48. The permanent magnet 69 preferably comprises a mixture of hard ferrite, for example, barium ferrite, and an elastic material. Thus, it is a so-called rubber magnet. The latter is trapezoidally or approximately trapezoidally magnetized via the pole pitch in a motor construction having a relatively small pole clearance. At the same time, the shielding can 26 forms the magnetic return path for magnet 69. The shielding can 26 surrounds the magnetically active parts 48, 49, 69 of the driving motor 45 on the periphery thereof, as well as on one end thereof. The bottom 28 of shielding can 26 is adapted to the shape of the coil winding heads 27 of the stator winding 49 and contains a central opening 29, whose edge is in the immediate radial vicinity of the circumferential surface of the bearing tube 50. In this way, the shielding can effectively prevents the magnetic flux from straying towards the outside of the storage disk receiving part 25.

The storage disk receiving part 25 has two stepped stages 74 and 75, each of whose circumferential surfaces in the present embodiment carry a plurality of radially distributed and projecting bearing webs 79 or 80. The outsides of bearing webs 79, 80 are ground in a dimensionally true manner to accommodate the internal diameter of the hard storage disks to be placed on the receiving part 25. The stepped stages 74, 75 form shoulders 81, 82 and are provided respectively with an annular recess 83 and 84 at the foot axially of bearing webs 79, 80. This structure ensures that storage disks mounted on the bearings webs 79, 80, and having either one of two opening diameters, will cleanly engage against either the shoulder 81 or 82.

The assembly flange 24 is provided with a recess 85 in which is housed a printed circuit board 86. This printed circuit board carries a rotary position detector, for example a Hall IC, as well as other circuit components for the control and regulation of the driving motor 45. The Hall IC 63 extends up axially from the circuit board 86 to the immediate vicinity of the stator lamination 48. The permanent magnet 69 projects axially over the stator lamination 48 in the direction of circuit board 86 until it partly overlaps the Hall IC 63. In this way, the Hall IC 63 or, if desired, some other magnetic field-dependent semi-conductor component, determines the rotary position of the rotor of the driving motor 45.

In the illustrated embodiment, the two bearings 52, 53 are spaced approximately the same axial distance from the axial center of the permanent magnet 69 and the stator lamination 48.

Disk storages are most usually operated in "clean room" environments to protect them against contaminants. By means of the assembly flange 24, the storage drive is arranged on a partition (not shown) which separates the ultra-clean area for receiving the storage disks from the remainder of the interior of the equipment. Dirt particles, grease vapors and the like from bearing 52 and parts of the driving motor 45 are prevented from passing into the storage disk receiving area by labyrinth seals 90 and 91. The labyrinth seal 90 is formed in that the end of the bearing tube 50 away from the assembly flange 24 that projects into an annular slot 87 on the inside of the storage disk receiving part 25, accompanied by the formation of sealing gaps. Similarly, for forming the labyrinth seal 91, the end of the shield can 26 projects into the annular slot 88 of the assembly flange 24. The labyrinth seals 90, 91 are preferably dimensioned in the manner described in the aforementioned U.S. Pat. No. 4,438,542.

The embodiment of FIG. 3 differs from the arrangement according to FIGS. 1 and 2 in that storage disks having the same opening diameters are placed on bearing webs 79 of a storage disk receiving part 89, which surrounds the majority of the axial dimension of the magnetic shielding can 26. In other words, the magnetically active parts 48, 49, 69 of the driving motor 45 are partially located within the central opening of the storage disk. A bush-like hub 98 is pressed or cast into the storage disk receiving part 89. The rotor shaft 46 is then pressed into the hub 98. The edge of the central opening 29 in the bottom 28 of the shielding can 26 extends up to the portion 99 of the receiving part 89 which received the hub 98.

The bearing tube 50 projects in the axial direction on the side of the assembly flange 100 remote from the stator lamination 48. As a result, a particularly large axial spacing between the two bearings 52, 53 can be achieved. Axially, bearing 52 is in the vicinity of the axial center of the permanent magnet 69 and of the stator lamination 48. The axial spacing between bearing 52 and 53 is equal to or larger than double the bearing external diameter. To prevent electrical charging of the rotor which in operation rotates at high speed and which would disturb the operational reliability of the disk storage device, the rotor shaft 46 is electrically conductively connected to the equipment chassis by means of a bearing ball 78 and a spring contact (not shown). The printed circuit board 101, carrying the rotary position detector 63 and the other electronic components, is supported on the end of a spacer ring 102 facing an assembly flange 100 and is located between the flange and the stator lamination 48. An annular slot 103 is formed in assembly flange 100 and is aligned with the annular circuit board 101. The annular slot 103 provides space for receiving the wire ends and soldered connections projecting from the underside of the circuit board 101.

FIG. 4 shows an embodiment in which a storage disk receiving part 105 is axially extended in order to be able to house a larger number of storage disks than in the arrangement of FIG. 3. The bearing tube 50 is correspondingly axially extended in order to be able to use the existing installation space with a view to a maximum axial spacing between the bearings 52 and 53. The end of the bearing tube 50, remote from as assembly flange 106, embraces the hub 98 connecting the receiving part 105 and the shaft 46, accompanied by the formation of a labyrinth seal 107. The edge of the central opening 29 of shielding can 26 extends up close to the outside of the bearing tube 50. The free end of the shielding can 26 engages a recess 108 in the assembly flange 106. As a result, a further labyrinth seal 109 is formed. This embodiment otherwise corresponds to the structures described hereinbefore.

In a further development of the invention where a disk storage drive utilizes a brushless D.C. drive motor having a stator provided with a winding and an external rotor coaxially surrounding the stator and spaced therefrom by a substantially cylindrical air gap, the rotor includes a permanent magnetic rotor magnet and a soft magnetic yoke. The motor further includes a hub concentric to the yoke and connected to the rotor for rotation therewith. The hub has a disk mounting or support portion, which extends through the central opening of the storage disk and receives at least one storage disk in a clean area space or chamber of a storage drive.

In known disk storage drives of this type there is a hub or armature sleeve for receiving the storage disk or disks wherein the disk mounting portion extends over a small part of the axial dimension of the magnetically active stator and rotor parts, i.e. the stator winding and the rotor magnet that interacts therewith.

In disk storage units, there is an increasing need for reducing the space requirement for the storage unit. Thus, another problem of the invention is to provide a disk storage drive that takes up particularly little space and consequently allows a minimization of the disk storage dimensions.

According to a further aspect of the invention, this problem is solved by the stator winding and the rotor magnet interacting therewith, at least with respect to half their axial dimension, being housed within the area surrounded by the disk mounting portion of the hub. The magnetically active parts of the drive motor in this construction are located mostly within the space which is already required for holding the storage disks, particularly magnetic rigid storage disks, but also storage disks of other types, e.g. optical storage disks.

Preferably, the stator winding and the motor magnet interacting therewith are contained within the space surrounded by the disk mounting portion of the hub by up to $\frac{2}{3}$ of their axial dimension. A particularly space-saving overall arrangement is obtained if the magnetically active stator and rotor parts are located substantially completely within this space.

The diameter of the central opening of the storage disks, e.g. magnetic rigid storage disks, is standardized and consequently its size is predetermined by industry and the market to a fixed value. However, the application of the drive energy requires a certain motor size. The conditions are particularly critical in known small storage disks with a central opening diameter of, for example, only 25 mm. In order to provide maximum space for the magnetically active motor parts in the diametrically limited area of the storage disk central opening, according to even a further development of the invention, the wall thickness of the disk mounting portion of the hub is minimized consistent with needed mechanical strength. The wall thickness of the disk mounting portion is approximately the same as and preferably smaller than the wall thickness of the part of the magnetic yoke which is concentric thereto.

The disk mounting portion preferably has a cylindrical outer peripheral surface, that is, a peripheral surface free from bearing webs or ribs in providing a maximum cross section while taking into account the fixed diameter of the central opening of the storage disks consistent with the necessary mechanical strength of the hub.

At least those surface parts of the hub located in the clean area or chamber of the drive must not give off, even during prolonged use of the disk storage drive, significant quantity of dirt particles, for example, from oxidation. Preferably, the hub is made from a material which, even after cutting, is suitable for use in a clean area or chamber, that is, a material which after being cut, and without a corrosion-inhibiting treatment following the cutting, meets the strict cleanness conditions necessary with disk storage drives in the clean chamber of the drives receiving the storage disks. Such a construction makes it possible to finish, for example, by grinding or otherwise stripping the outer peripheral surface of the disk support portion after assembly of the hub and the drive motor with respect to the centricity with the rotation axis. Such metal finishing of the installed hub is frequently necessary in order to fulfil the extreme demands in connection with disk storage drives with respect to accuracy of rotation or minimization of untrueness of the hub. It is particularly appropriate to have a hub made from light metal, preferably aluminum or an aluminum alloy. Light metal hubs can be used in clean chambers without further treatment, even after cutting has taken place. For example, by using a diamond tool, and while respecting the necessary precision, such hubs can be stripped in a less expensive way than by grinding, particularly the disk mounting portion with a cylindrical outer circumferential surface. The hub is preferably impact extruded or cast and is pressed hot on the magnetic yoke. In principle, other possibilities for joining hub and yoke exist, such as a bonding together of the two parts.

The magnetic yoke can have a cup or pot-shaped construction as is known. It is more advantageous, however, to provide an annular magnetic yoke and approximately insert a magnetic shield ring in the hub extending radially inwardly substantially from the clean chamber axial end of the annular magnetic yoke. As a result, necessary guidance of the magnetic flux and efficient magnetic shielding of the storage disks with respect to the drive motor are achieved. The combination of yoke ring and shield ring can be produced less expensively than a cup or pot. The shield ring can be relatively thin so that the overall axial size of the drive can be further reduced, or, for a constant axial size, provide more space for a hub end wall at the closed end of the subassembly comprising the hub, magnetic yoke and motor magnet. The magnetic yoke can be appropriately constructed as a rolled ring, particularly a steel ring, or as a portion of a tube.

The rotor and the hub can be fixed to a shaft which is supported in a bearing system at least partly housed within the drive motor stator. A bearing bush receiving the shaft can be shaped on to the yoke, if the yoke is constructed in cup-shaped manner, or preferably on to the hub. This obviates a separate component of the bush. The rotor and the hub can, according to a modified construction, be mounted to rotate together via a bearing system of a fixed shaft, the leads of the stator winding passing through the fixed shaft to the outside of the drive.

A control magnet, for example, in the form of a control magnet ring, is preferably connected to the unit that includes the rotor and the hub, the magnet interacting with a stationary magnetic field-sensitive rotation position sensor whose function is to produce commutating control signals and optionally additional control signals, such as a pulse for a given rotor reference position. The control magnet is appropriately located on the axially open side of the unit that includes the rotor and hub. It can be axially aligned with the rotor magnet. The rotor magnet can optionally serve as the control magnet. The rotation position sensor is advantageously placed on a printed circuit board axially facing the axially open side of the unit comprising the rotor and hub.

Figure 6:
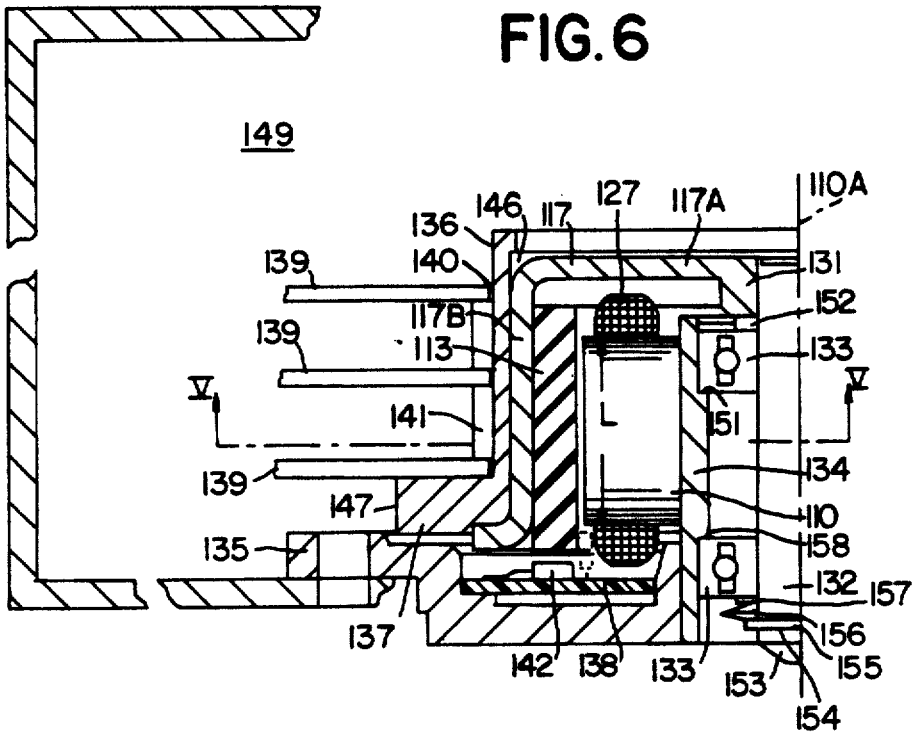
FIG. 6 is a diagrammatic section along line VI—VI of FIG. 5.

In FIGS. 5 and 6, the drive motor 118 has a stator 119 with a stator lamination bundle 110. The bundle 110 is radially symmetrical with respect to a central rotation axis 110A and is provided with an annular central portion 110B. The stator laminations 110 form six stator poles 111A to 111F, each of which, in the plan view according to FIG. 5, has a substantially T-shaped configuration. The stator poles are positioned with a reciprocal angular distance of 60°. A sintered iron core can be provided in place of a bundle of laminations. Pole shoes 112A to 112F of the stator poles together with a permanent magnetic motor magnet 113 define a substantially cylindrical air gap 114. In the manner indicated in FIG. 5, motor magnet 113 is radially magnetized in quadripolar manner in the circumferential direction, that is, it has four portions 113A to 113D and on the inside of the annular motor magnet 113 facing the air gap 114 are provided in alternating sequence two magnetic north poles and two magnetic south poles 115, 116. In the illustrated embodiment, each of the poles 115 and 116 have a width of substantially 180° el, (corresponding to 90° mechanical). Thus, an approximately rectangular or trapezoidal magnetization is obtained in the circumferential direction of the air gap 114.

The motor magnet 113 is fitted in a soft magnetic material external rotor cup or pot 117 serving as a magnetic yoke and has a magnetic shield bonded thereinto. The cup 117 and the magnet 113 together form an external rotor 130. The external rotor cup 117 has an end wall 117A (FIG. 6) and a cylindrical circumferential wall 117B. The motor magnet 113 can be a rubber magnet, or a plastic-bonded magnet. In place of a one-part magnet ring, dish-shaped magnet segments can be bonded or in some other way fixed into the cup 117. Particularly suitable materials for the magnet ring or segments are magnetic material in a synthetic binder, a mixture of hard ferrite and elastomeric material, ceramic magnetic material or samarium cobalt. While in the represented embodiment each of the poles extends over substantially 180° el, it is also possible to work with narrower poles. The rotor pole width, however, should be at least 120° el to obtain a high motor output.

Together the stator poles 111A to 111F define six stator slots 120A to 120F, in which is placed a three-strand stator winding. Each of the three strands includes two 120° el-cored coils 121,122; 123,124; and 125,126. Each is wound around one of the stator poles 111A to 111F. The two coils in series of each strand diametrically face one another, as shown in FIG. 5. The coils are preferably wound in bifilar manner (not shown). As can be gathered from the diagrammatic representation of FIG. 5, any overlap between coils 121 to 126 is avoided and in this way particularly short coil winding heads 127 (FIG. 6) are obtained. The slot openings 128A to 128F can be between 3° el and 30° el. In the present stator winding configuration, slots 120A to 120F can be excellently filled. There is generally no need to provide caps for the slot openings 128A to 128F.

The present motor design makes it possible to obtain a relatively large hole 129 within the stator, because the depth of the stator slots 120A to 120F can be kept relatively small. It is easy to obtain ratios between the diameter I of internal hole 129 and the stator external diameter E of the pole shoes 112 of at least 0.35. Preferably, the I/E value is in the range 0.4 to 0.7. The L/E ratio between the axial length L (FIG. 6) of the stator iron and the stator external diameter E is preferably equal to or smaller than 1. These dimensioning ratios are of particular significance in connection with a stable mounting of the rotor. This is of particular importance in connection with drives for disk storage systems. In addition, the overall resistance of the stator winding is kept particularly small.

For the purpose of the mounting of the rotor 130, according to FIG. 6 in the center of the external rotor cup 117 is fixed a stub shaft 132 via a bearing bush 131 shaped on to the cup, the shaft being supported via axially spaced ball bearings 133 in a cylindrical sleeve 134, which also carries the stator laminations 110 and is fixed to an assembly flange 135.

A preferably light metal hub 137 (FIG. 6) for a rigid disk is provided with a cylindrical disk mounting portion 136 and is placed, for example, by shrinking onto the external rotor cup 117. One or more rigid storage disks 139, preferably magnetic disks, are placed on the disk mounting portion 136. The disk mounting portion extends through a central opening 140 in the storage disks 139, which are reciprocally axially spaced by spacers 141 and are fixed with respect to the hub 137 by a known clamping device. In the embodiment shown in FIG. 6, somewhat more than § of the axial dimension of the magnetically active stator and rotor parts of drive motor 118, that is, the motor magnet 113 and the stator windings 121 to 126 project into a space or volume 146 surrounded by the disk mounting portion 136. The wall thickness of the disk mounting portion 136 of the hub 37 is smaller than the wall thickness of the cylindrical circumferential wall 117B of the cup 117 that forms the magnetic yoke, so that a maximum cross section is made available for the rotor parts 113, 117, 119 in the predetermined central opening 140. In particular, the wall thickness of the disk support portion 136 is made as small as possible consistent with mechanical strength requirements. To increase the dimensional stability of the hub 137, near the open end of the unit that includes the hub 137, the external rotor cup 117 and the motor magnet 113, the hub carries a thickened, outwardly radially projecting flange 147, which simultaneously axially supports the rigid storage disk 139 closest to the flange.

The hub 137, together with the storage disks 139 supported thereon, is located in a clean chamber 149, defined by the disk storage casing parts. The assembly flange 135 forms part of the clean chamber boundary towards the lower side in FIG. 6. The upper bearing 113 in FIG. 6 is located between a shoulder 151 on the sleeve 134 and a spacing ring 152, whose side remote from the bearing 133 engages the bottom surface of the bearing bush 131. The stub shaft 132 is convex at its lower end 153 and is approximately mounted in an axial bearing (not shown). Close to the lower end 153, a fastening ring 155 is arranged in an annular slot 154 of the shaft 132. Against the upper surface of the ring bear two cup springs 156, which engage on an intermediate ring 157. The lower ball bearing 153 is positioned between the intermediate ring 157 and a further shoulder 158 of the sleeve 134.

The assembly flange 135 carries a circuit board 138, which can optionally carry the commutating electronics and/or other circuit components, such as for speed regulation. The circuit board 130 more particularly carries three rotation position sensors 142, 143, 144. In the illustrated embodiment, they are magnetic field sensors, such as Hall generators, field plates, magnetic diodes and the like. Bistable-switching Hall IC's are particularly advantageous. The use of 180° el wide rotor poles 115, 116 makes it possible to use the motor magnet 113 as the control magnet of the position sensors 142, 143, 144. The embodiment according to FIG. 6 shows the rotation position sensors 142, 143, 144 (of which only sensor 142 is seen) axially facing the magnet 113 controlling them. It is also possible to arrange the rotation position sensors in the manner indicated in broken line form in FIG. 6 to radially face the magnet 113 controlling them. The rotation position sensors 142, 143, 144 are appropriately so peripherally positioned with respect to the coils 121 to 126 that changes to the sensor switching states substantially coincide with the zero crossings of the associated coil voltages. In the embodiment according to FIG. 5 this is achieved in that the rotation position sensors are displaced by 15° mechanical with respect to the center of the slot openings 128A, 128B, 128C.

Figure 7:
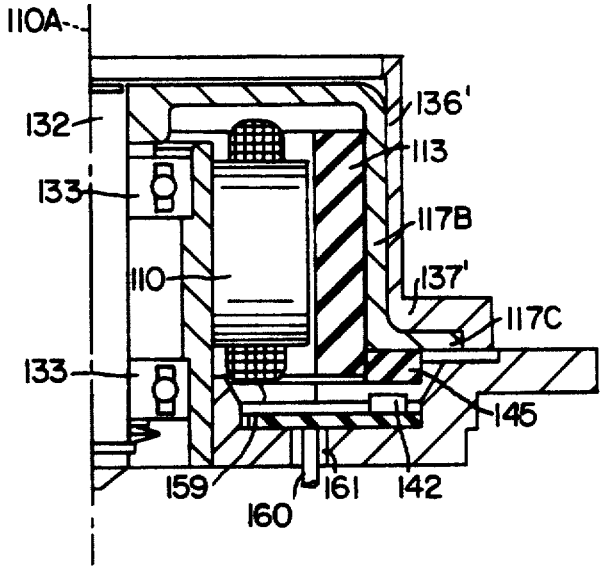
FIG. 7 is a section similar to FIG. 6 for a modified embodiment.

The embodiment according to FIG. 7 essentially differs from that according to FIG. 6 in that a control magnet 145 separate from the motor magnet 113 is provided for energizing the rotation position sensors 142, 143, 144. The control magnet 145 is located radially outside the motor magnet 113 on the bottom of a flange 117C, which projects radially outwardly from the peripheral wall 117B of the external rotor cup 117, on its open end. The external rotor cup 117 and the hub 137' terminate in a flush manner at the open end in the embodiment of FIG. 7. At 159 is indicated a connection of one of the coils 121, 126 to a contact of the printed circuit board 138 which extends outwardly through an opening 161 in the assembly flange 135, a connecting cable 160.

Figure 8:
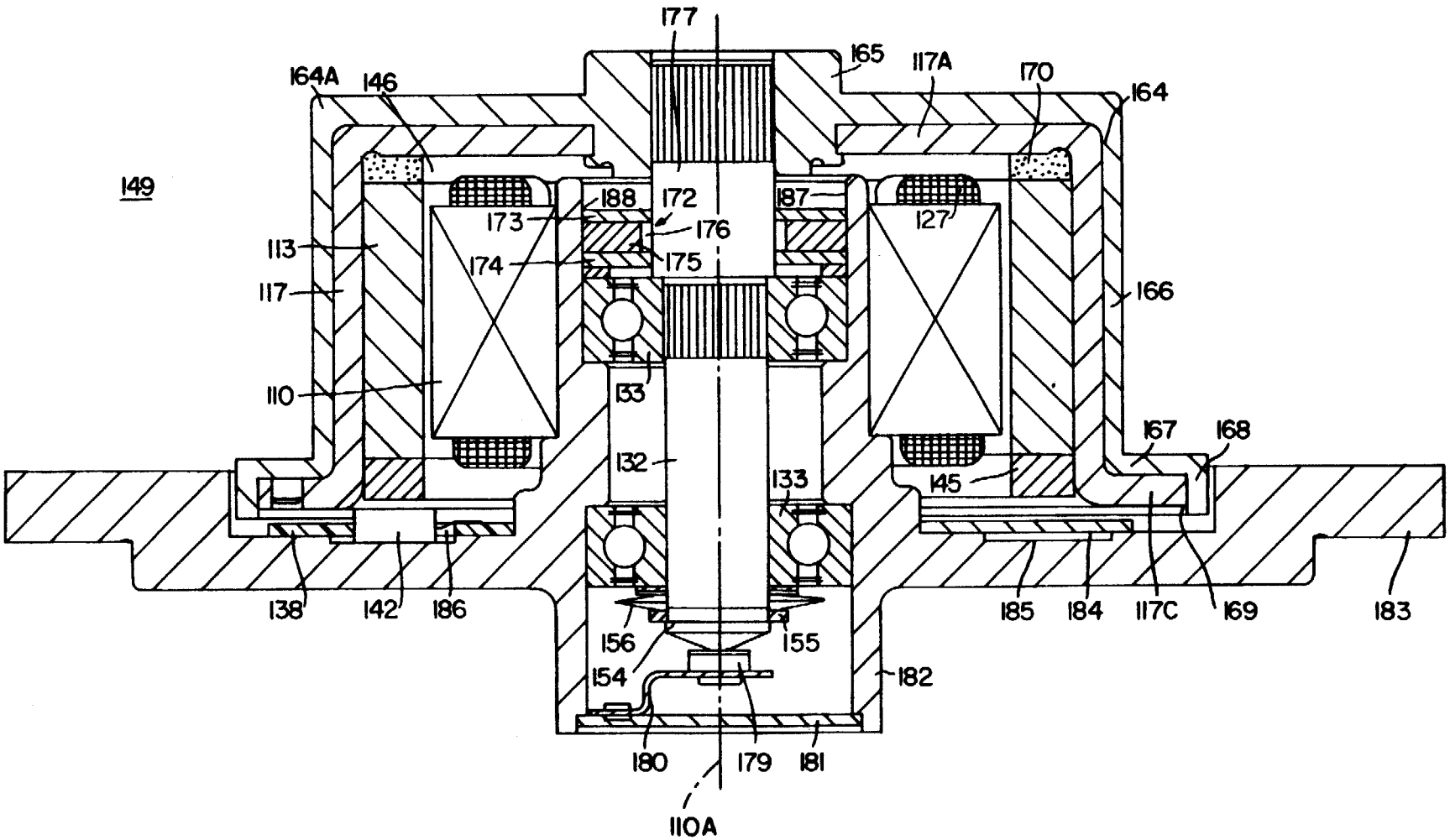
FIG. 8 is an axial section through a disk storage drive according to a further modified embodiment of the invention.

FIG. 8 illustrates another embodiment of the disk storage drive in which, differing from the embodiment of FIGS. 6 and 7, a hub 164 corresponding to the hub 137 has an end wall 164A engaging the end wall 117B of the external rotor cup 117. A bearing bush 165 for the shaft 132 is formed integrally in the end wall 164A. On the end of the disk support portion 166 of the hub 164 remote from the end wall 164A is located a radially outwardly bent flange 167, which passes into a circumferential wall 168 concentric to, but having a larger diameter than, the disk mounting portion 166. The circumferential wall 168 engages radially and externally over the flange 117C of the cup 117. The junction between the flange 117C and the circumferential wall 168 is sealed in the manner indicated at 169 by varnish, adhesive or the like. Thus, as in FIG. 7, it is ensured that dirt particles are not passed radially outwardly from the flange 117C and into the clean chamber 149. The control magnet 145 interacting with the rotation position sensors (of which only sensor 142 is shown in FIG. 8) is axially aligned with the motor magnet 113 and is fitted to the side of the magnet 113 remote from the end wall 117A. The external rotor cup 117 is drawn down to such an extent in FIG. 8 that it surrounds the control magnet 145. The space left free between the end wall 117A and the end of the magnet 113 facing the wall is filled with an adhesive or some other filling material 170. The bearing system for the shaft 132 formed by the two ball bearings 133 is sealed with respect to the inner area of the motor and consequently with respect to the clean chamber 149 by means of a magnetic fluid seal 172, which comprises two annular pole pieces 173, 174, a permanent magnet ring 175 located between these pole pieces and a magnetic fluid (not shown), which fluid is introduced into an annular clearance 176 between the magnetic ring 175 and a portion 177 of the shaft 132. Seals of this type are known as "ferro-fluidic seals". The seal 172 effectively prevents the passage of dust particles from the bearing system into the clean chamber 149. The seal 172 is adjacent to, but axially spaced from, the bearing bush 165, which ensures that magnetic fluid is not drawn by capillary action out of the seal 172.

As can be gathered from FIG. 8, the magnetically active stator and rotor parts are substantially completely housed within the space enclosed by the disk support portion 166. FIG. 8 also shows an axial bearing 179 for the shaft 132. The bearing 179 is located on a spring clip 180, which is in turn placed on a cover 181 introduced into the end of a sleeve 182 remote from the clean chamber 49. Similarly to the sleeve 134 of the embodiment according to FIGS. 6 and 7, the sleeve 182 receives the bearings 133, but is connected in one piece with the assembly flange 183 corresponding to the assembly flange 135.

Similarly to the spring clip 180, the axial bearing 179 is preferably electrically conducting. This makes possible the elimination of electrostatic charges of the shaft 132 via the bearing 179 in the spring clip 180.

The circuit board 138 is connected to the assembly flange 183 via an adhesive coating 184, which is located in a slot 185 of the assembly flange 183. To further reduce the overall axial height of the disk storage drive, the circuit board 138 is provided with openings 186 in the vicinity of the rotation position sensors, and the rotation position sensors are introduced into the slot 185 and the openings 186. Near the engagement point between the upper pole piece 173 and the inner circumferential wall 187 of the sleeve 182, an additional seal by means of coating lacquer or the like is provided at 188.

Figure 9:
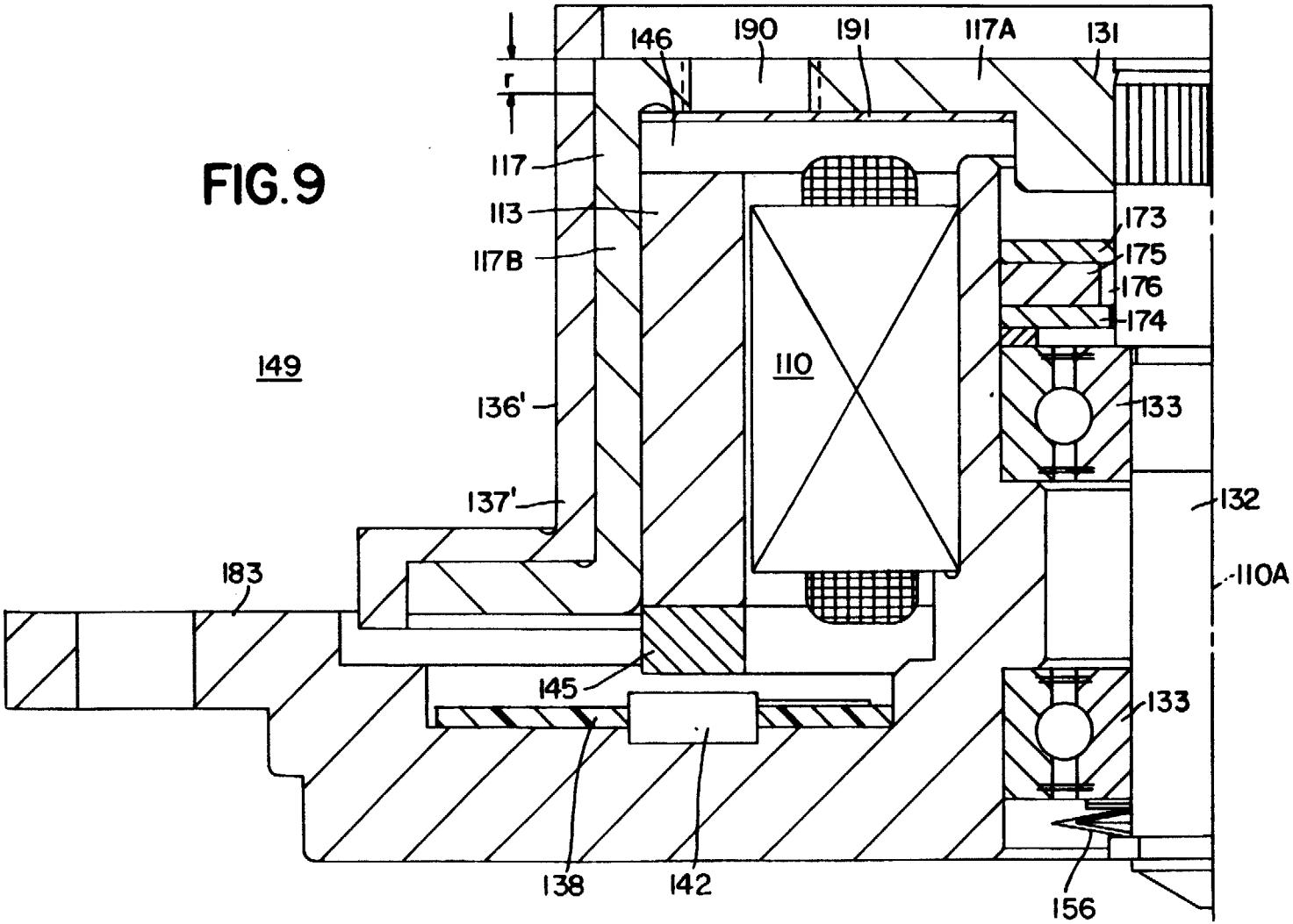
FIG. 9 is an axial partial section for a further modified embodiment.

The embodiment according to FIG. 9 is similar to that of FIG. 8. The bearing bush 131, however, is formed integrally in the end wall 117A of the external rotor cup 117, which acts as a magnetic shield. The end wall 117A contains three threaded holes 190, which are circumferentially displaced from one another by 120°. The holes 190 are used for fitting the earlier mentioned but not shown clamping device for the rigid storage disks 139 (FIG. 6). Under the end wall 117A is located a cover ring 191 which seals the inner area of the motor relative to the clean chamber 149 near the threaded holes 190. Most of the axial length of the magnetically active stator and rotor parts of the drive motor are once again located in the area 146, which is surrounded by the disk support portion 136' of the hub 137' similar to that shown in FIG. 7.

Figure 10:
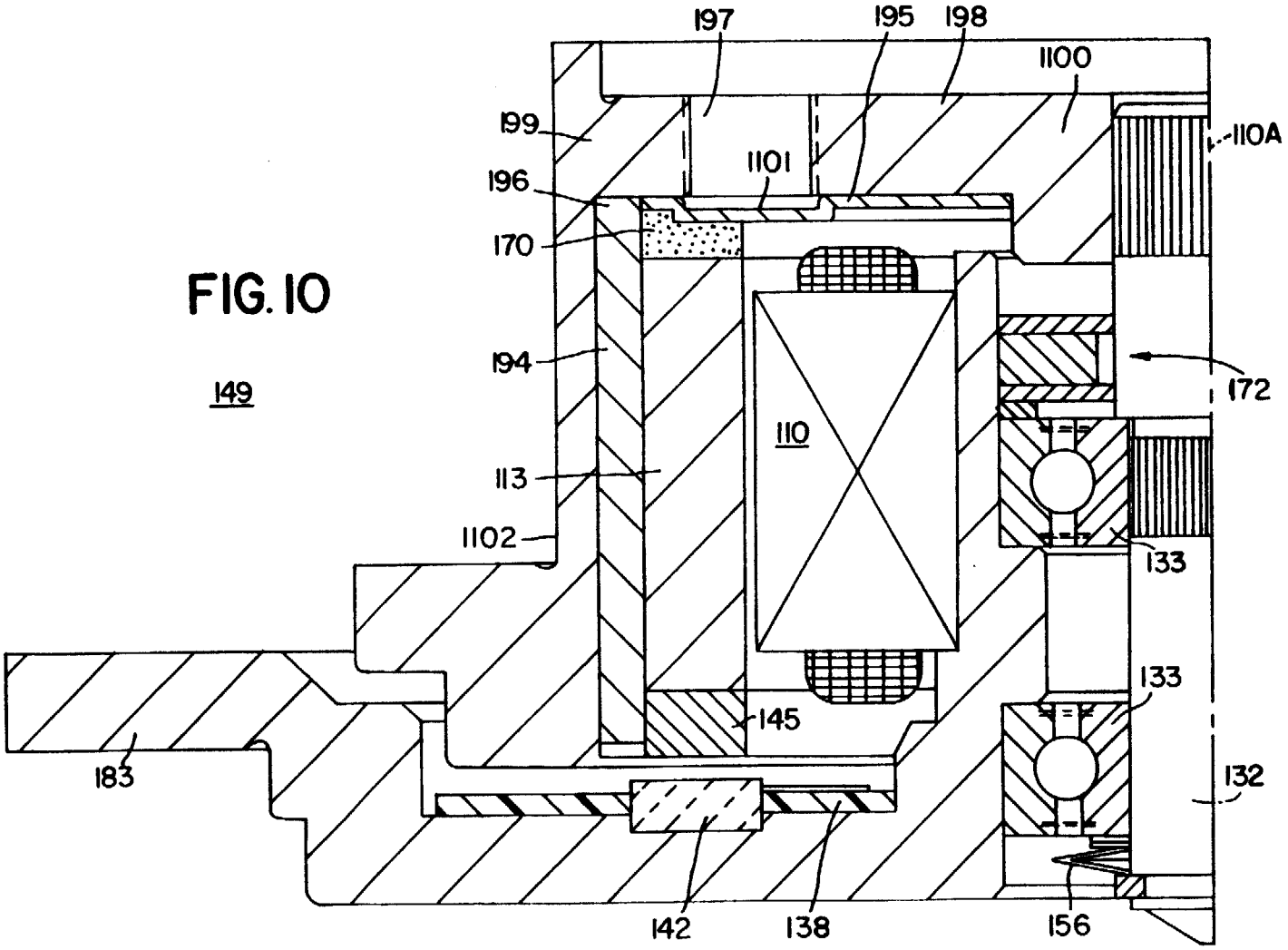
FIG. 10 is an axial partial section for an embodiment with a magnetic yoke ring and separate axial shield ring.

FIG. 10 shows a further modified embodiment of the invention, which essentially differs from the previous constructions of FIGS. 5–9 in that the external rotor cup 117 is replaced by a soft magnetic yoke ring 194 and a separate soft magnetic shield ring 195. The shield ring 195 extends from the clean chamber-side axial end 196 of the yoke ring 194 in a radially inwardly direction. The wall thickness of the shield ring 195 can be much less than that of the yoke ring 194. Threaded holes 197 functionally corresponding to the threaded holes 190 of FIG. 9 are formed in the end wall 198 of a hub 199, in which integrally is formed the bearing bush 1100 for the shaft 132. Near the threaded holes 197, a shield ring 195 is provided with depressions 1101, which depressions permit the use of the full thread length of the threaded holes 197. Filling material 170 is provided in the space between the upper end of the motor magnet 113 in FIG. 10, the end 196 of the yoke 194 and the radially outer part of the shield ring 195. The magnetically active rotor and stator parts are more than ⅔ located in the area surrounded by the cylindrical disk support portion 1102 of the hub 199.

The yoke ring 194 can be a rolled ring, particularly a steel ring, or a portion of a tube. Manufacture is simplified compared with the use of an external rotor cup 117. In addition, additional axial length is saved, because on the one hand the wall thickness of the shield ring 195 can be kept small, and because on the other hand no space is lost, considering the way in which some space is required when using the cup 117 with its radius r (FIG. 9) at the transition point between its circumferential wall 117B and its end wall 117A. The axial construction space which thus has been made available can be used to give the end wall 198 a greater thickness and consequently increase the length of the threaded holes 197.

Figure 12:
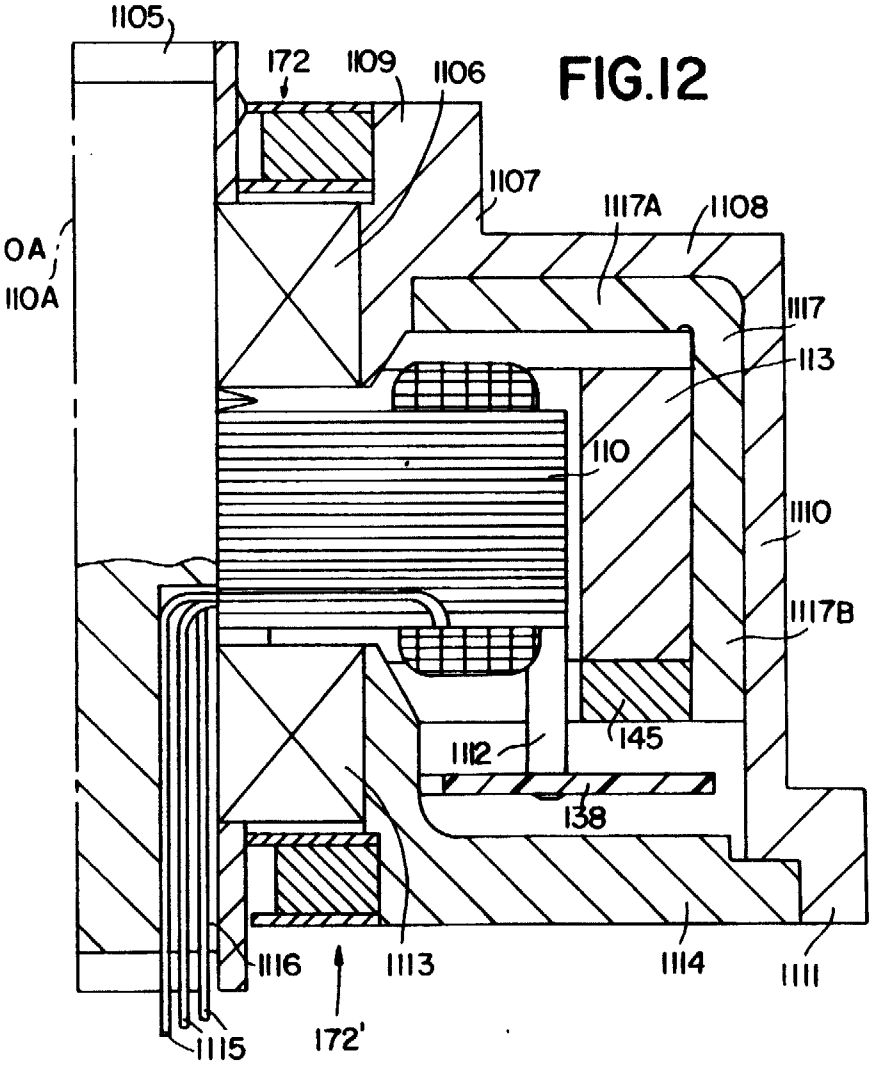
FIG. 12 is a partial section corresponding to FIG. 11 for an embodiment with a fixed shaft.
Figure 11:
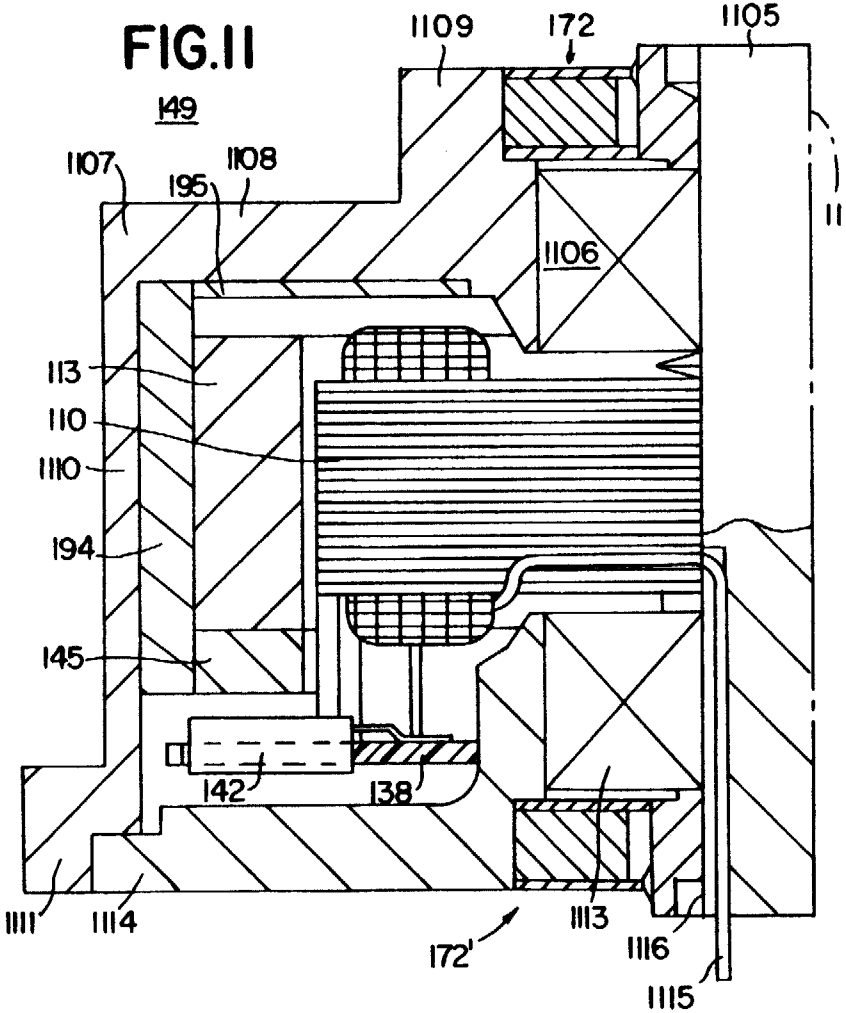
FIG. 11 is an axial partial section through a further modified embodiment of a disk storage drive with a fixed shaft.

Whereas in the case of the embodiment according to FIGS. 5 to 10, the shaft 132 rotates in operation, FIGS. 11 and 12 illustrate embodiments with a stationary shaft 1105. According to FIG. 11, the shaft 1105 is fitted into the disk storage device. By means of a first ball bearing 1106, a hub 1107 is mounted to rotate on the shaft 1106. The hub 1107 has an end wall 1108 with a formed-in bearing bush 1109, a disk support portion 1110 and, on the side remote from end wall 1108, a radially outwardly projecting reinforcing flange 1111. The hub 1107 is connected to a soft magnetic yoke ring 194. The soft magnetic shield ring 195 engages the inside of the end wall 1108. The circuit board 138 with the rotation position sensors, of which only the sensor 142 is shown in FIG. 11, is suspended by means of supports 1112 (FIG. 12) on the stator laminations 110. A motor cover 1114 is mounted by means of a second ball bearing 1113 on the shaft 1105, the cover tightly sealing the motor on the axial end remote from the end wall 1108. A magnetic fluid or ferrofluidic seal 172 or 172' discussed in detail relative to FIG. 8, is provided on each of the outside of the bearings 1106, 1113. The seals 172, 172' ensure a sealing of the bearing system with respect to the clean chamber 149, so that the complete drive motor can be located in the clean chamber. The connections of the stator winding and/or the electronic components mounted on the circuit board 138 can be led out by means of a cable 1115, which is placed in an axial slot 1116 of the shaft 1105.

The embodiment of FIG. 12 differs from that of FIG. 11 substantially in that in place of the shield ring 195 and the yoke ring 194 there is a one-piece soft magnetic material cup 1117 with an end wall 1117A and a circumferential wall 1117B corresponding to the cup 117.

In the embodiments according to FIGS. 11 and 12, the magnetically active stator and rotor parts of the drive motor are located within the area surrounded by the disk mounting portion 1110.

It should be apparent that certain constructional features are interchangeable in all the illustrated embodiments.

What is claimed is:

1. A disk storage drive comprising:

a clean chamber for housing a storage disk;

a brushless drive motor having a stator and a winding on the stator, the stator having an axial longitudinal dimension and the winding having a pair of opposed end surfaces;

an external rotor having a rotation axis and coaxially surrounding the stator, an inner wall of said rotor being spaced from said stator by a substantially cyclindrical air gap, said rotor having a permanent magnet with an axial longitudinal dimension and a soft magnetic yoke with an axially extending wall portion and a radially extending wall portion, said permanent magnet forming the inner wall of said rotor adjacent the air gap;

a hub held fast on the rotor for rotation therewith and being coaxial to the yoke, said hub having a machinable outer surface and being made of a non-ferromagnetic, non-corrodible material suitable for use in a clean chamber following machining of the outer surface;

an outer peripheral cylindrical surface on said hub dimensioned to pass through a standardized central opening of a storage disk for receiving and mounting the storage disk for rotation therewith in said clean chamber, said outer peripheral cylindrical surface radially enclosing said soft magnetic yoke of said rotor and said stator for a substantial part of the axial extensions thereof, and at least half of the axial longitudinal dimension of the stator winding and of the rotor magnet interacting magnetically therewith being housed within said outer peripheral cylindrical surface of the storage disk mounting portion of the hub, and said yoke radial wall portion extending radially inwardly from one axial end of the yoke axial wall portion by a distance sufficient to extend over the adjacent one of said pair of winding end surfaces.

2. A disk storage drive as claimed in claim 1, wherein at least two-thirds of said axial longitudinal dimension of the stator winding and of the rotor magnet interacting magnetically therewith is housed within the disk mounting portion of the hub.

3. A disk storage drive as claimed in claim 2, wherein the stator winding and the rotor magnet interacting therewith are substantially completely housed within the disk mounting portion of the hub.

4. A disk storage drive as claimed in claim 1, wherein the wall of the disk mounting portion is no thicker than the wall of the part of the magnetic yoke coaxial therewith.

5. A disk storage drive as claimed in claim 4, wherein the disk support mounting wall is thinner than said yoke wall.

6. A disk storage drive as claimed in claim 1, wherein the hub is made from light metal.

7. A disk storage drive as claimed in claim 1, wherein the external circumferential surface of the disk mounting portion of the hub, after assembly of hub and drive motor, is finished with respect to centricity with the rotation axis.

8. A disk storage drive as claimed in claim 7, wherein said surface is ground or turned to finish.

9. A disk storage drive as claimed in claim 1, wherein the hub is extruded or cast.

10. A disk storage drive as claimed in claim 1, wherein the hub is pressed hot on the magnetic yoke.

11. A disk storage drive as claimed in claim 1, wherein the magnetic yoke is annular.

12. A disk storage drive as claimed in claim 11, wherein a magnetic shield ring is placed in the hub and extends from the inside wall of the hub radially inwardly and substantially from one axial end of the annular yoke.

13. A disk storage drive as claimed in claim 1, wherein the rotor and the hub are fixed to a shaft rotatably supported axially in a bearing system that is at least partly housed within the stator of the drive motor.

14. A disk storage drive as claimed in claim 13, wherein a bearing bush receiving the shaft is formed integrally in the hub or the magnetic yoke.

15. A disk storage drive as claimed in claim 14, wherein the bearing system is sealed by means of at least one magnetic fluid or ferro-fluidic seal.

16. A disk storage drive as claimed in claim 15, wherein the magnetic fluid or ferro-fluidic seal is positioned adjacent to but axially spaced from the bearing bush.

17. A disk storage drive as claimed in claim 1, wherein the rotor and the hub are rotatably mounted by means of a bearing system on a fixed shaft.

18. A disk storage drive as claimed in claim 17, wherein leads are provided for the stator winding that pass through the fixed shaft to the outside of the drive.

19. A disk storage drive as claimed in claim 1, wherein a control magnet is connected to the unit that includes the rotor and hub, and interacts with a stationary, magnetic field-sensitive rotation position sensor.

20. A disk storage drive as claimed in claim 19, wherein the control magnet is positioned on that side of the unit that includes the rotor and hub and that is open in the axial direction.

21. A disk storage drive as claimed in claim 19, wherein the control magnet is axially aligned with the rotor magnet.

22. A disk storage drive as claimed in claim 19, wherein the rotation position sensor is mounted on a printed circuit board that axially faces the side of the unit that includes the rotor and hub and that is open in the axial direction.

23. A disk storage drive as claimed in claim 1, wherein the ratio of inner and outer diameters of the stator is at least 0.35.

24. A disk storage drive as claimed in claim 23, wherein said ratio is 0.4 to 0.7.

25. A disk storage drive as claimed in claim 1, wherein the ratio of axial length to external diameter of the stator does not exceed 1.

26. A disk storage drive comprising:

a clean chamber for housing a storage disk;

a brushless drive motor having a stator and a winding on the stator, the stator having an axial longitudinal dimension;

an external rotor having a rotation axis and coaxially surrounding the stator, an inner wall of said rotor being spaced from said stator by a substantially cylindrical air gap, said rotor having a permanent magnet with an axial longitudinal dimension and a soft magnetic annular yoke with an axially extending wall portion, said permanent magnet forming the inner wall of said rotor adjacent the air gap;

a hub held fast on the rotor for rotation therewith and being coaxial to the yoke, said hub having a machinable outer surface and being made of a non-ferromagnetic, non-corrodible material suitable for use in a clean chamber following machining of the outer surface;

an outer peripheral cylindrical surface on said hub dimensioned to pass through a standardied central opening of a storage disk for receiving and mounting the storage disk for rotation therewith in said clean chamber, said outer peripheral cylindrical surface radially enclosing said soft magnetic yoke of said rotor and said stator for a substantial part of the axial extensions thereof, and at least half of the axial longitudinal dimension of the stator winding and of the rotor magnet interacting magnetically there with being housed within said outer peripheral cylindrical surface of the storage disk mounting portion of the hub; and a magnetic shield ring located in the hub and extending from the inside wall of the hub radially inwardly and substantially from one axial end of the annular yoke.

*27. A disk storage drive comprising:*

*a clean chamber for housing a storage disk;*

*a brushless drive motor having a stator and a winding on the stator, the stator having an axial longitudinal dimension;*

*an external rotor having a rotation axis and coaxially surrounding the stator, an inner wall of said rotor being spaced from said stator by a substantially cylindrical air gap, said rotor having a permanent magnet with an axial longitudinal dimension and a soft magnetic annular yoke with an axially extending wall portion, said permanent magnet forming the inner wall of said rotor adjacent the air gap;*

*a hub held fast on the rotor for rotation therewith and being coaxial to the yoke, said hub having a machinable outer surface and being made of a non-ferromagnetic, non-corrodible material suitable for use in a clean chamber following machining of the outer surface;*

*an outer peripheral cylindrical surface on said hub dimensioned to pass through a standardized central opening of a storage disk for receiving and mounting the storage disk for rotation therewith in said clean chamber, said outer peripheral cylindrical surface radially enclosing said soft magnetic annular yoke of said rotor and said stator for a substantial part of the axial extensions thereof, and at least half of the axial longitudinal dimension of the stator winding and of the rotor magnet interacting magnetically therewith being housed within said outer peripheral cylindrical surface of the storage disk mounting portion of the hub, and*

*a magnetic shield ring located in the hub and extending substantially from the soft magnetic annular yoke radially inwardly and substantially from one axial end of the soft magnetic annular yoke.*

*28. A disk storage drive as claimed in claim 27, wherein the stator winding and the rotor magnet interacting therewith are substantially completely housed within the disk mounting portion of the hub.*

*29. A disk storage drive as claimed in claim 27, wherein the wall of the disk mounting portion is no thicker than the wall of the part of the soft magnetic annular yoke coaxial therewith.*

*30. A disk storage drive as claimed in claim 29, wherein the disk support mounting wall is thinner than the wall of the soft magnetic annular yoke.*

*31. A disk storage drive as claimed in claim 27, wherein the hub is made from light metal.*

*32. A disk storage drive as claimed in claim 27, wherein the external circumferential surface of the disk mounting portion of the hub, after assembly of hub and drive motor, is finished with respect to centricity with the rotation axis.*

*33. A disk storage drive as claimed in claim 32, wherein said surface is ground or turned to finish.*

*34. A disk storage drive as claimed in claim 27, wherein the hub is extruded or cast.*

*35. A disk storage drive as claimed in claim 27, wherein the hub is pressed hot on the soft magnetic annular yoke.*

*36. A disk storage drive as claimed in claim 27, wherein the rotor and the hub are fixed to a rotatable shaft.*

*37. A disk storage drive as claimed in claim 27, wherein the rotor and the hub are fixed to a shaft rotatably supported axially in a bearing system that is at least partly housed within the stator of the drive motor.*

*38. A disk storage drive as claimed in claim 27, wherein a bearing bush receiving the shaft is formed integrally in the hub or soft magnetic annular yoke.*

*39. A disk storage drive as claimed in claim 38, wherein the bearing system is sealed by means of at least one magnetic fluid or ferrofluidic seal.*

*40. A disk storage drive as claimed in claim 39, wherein the magnetic fluid or ferrofluidic seal is positioned adjacent to but axially spaced from the bearing bush.*

*41. A disk storage drive as claimed in claim 27, wherein the rotor and the hub are rotatably mounted by means of a bearing system on a fixed shaft.*

*42. A disk storage drive as claimed in claim 41, wherein leads are provided for the stator winding that pass through the fixed shaft to the outside of the drive.*

*43. A disk storage drive as claimed in claim 27, wherein a control magnet is connected to the unit that includes the rotor and the hub, and interacts with a stationary magnetic position sensor.*

*44. A disk storage drive as claimed in claim 43, wherein the control magnet is positioned on that side of the unit that includes the rotor and the hub and that is open in the axial direction.*

*45. A disk storage drive as claimed in claim 43, wherein the control magnet is axially aligned with the rotor magnet.*

*46. A disk storage drive as claimed in claim 43, wherein the rotation position sensor is mounted on a printed circuit board that axially faces the side of the unit that includes the rotor and the hub and that is open in the axial direction.*

*47. A disk storage drive as claimed in claim 27, wherein the ratio of inner and outer diameters of the stator is at least 0.35.*

*48. A disk storage drive as claimed in claim 47, wherein said ratio is 0.4 to 0.7.*

*49. A disk storage drive as claimed in claim 27, wherein the ratio of axial length to external diameter of the stator does not exceed 1.*

*50. A disk storage drive comprising:*

*a clean chamber for housing a storage disk;*

*a brushless drive motor having a stator and a winding on the stator, the stator having an axial longitudinal dimension;*

*an external rotor having a rotation axis and coaxially surrounding the stator, the rotor being fixed to a shaft rotatably supported axially in a bearing system that is at least partly housed within the stator, an inner wall of said rotor being spaced from said stator by a substantially cylindrical air gap, said rotor having a permanent magnet with an axial longitudinal dimension and a soft magnetic annular yoke with an axially extending wall portion, said permanent magnet forming the inner wall of said rotor adjacent the air gap;*

*a hub held fast on the rotor for rotation therewith and being coaxial to the yoke, said hub having a machinable outer surface and being made of a non-ferromagnetic, non-corrodible material suitable for use in a clean chamber following machining of the outer surface;*

*an outer peripheral cylindrical surface on said hub dimensioned to pass through a standardized central opening of a storage disk for receiving and mounting the storage disk for rotation therewith in said clean chamber, said outer peripheral cylindrical surface radially enclosing said soft magnetic annular yoke of said rotor and said stator for a substantial part of the axial extensions thereof, and at least half of the axial longitudinal dimension of the stator winding and of the rotor magnet interacting magnetically therewith being housed within said outer peripheral cylindrical surface of the storage disk mounting portion of the hub, and*

*a magnetic shield ring located in the hub and extending substantially from the soft magnetic annular yoke radially inwardly and substantially from one axial end of the soft magnetic annular yoke.*

*51. A disk storage drive comprising:*

*a clean chamber for housing a storage disk;*

*a brushless drive motor having a stator and a winding on the stator, the stator having an axial longitudinal dimension;*

*an external rotor having a rotation axis and coaxially surrounding the stator, the rotor being rotatably mounted by means of a bearing system on a fixed shaft, an inner wall of said rotor being spaced from said stator by a substantially cylindrical air gap, said rotor having a permanent magnet with an axial longitudinal dimension and a soft magnetic annular yoke with an axially extending wall portion, said permanent magnet forming the inner wall of said rotor adjacent the air gap;*

*a hub held fast on the rotor for rotation therewith and being coaxial to the yoke, said hub having a machinable outer surface and being made of a non-ferromagnetic, non-corrodible material suitable for use in a clean chamber following machining of the outer surface;*

*an outer peripheral cylindrical surface on said hub dimensioned to pass through a standardized central opening of a storage disk for receiving and mounting the storage disk for rotation therewith in said clean chamber, said outer peripheral cylindrical surface radially enclosing said soft magnetic annular yoke of*

*said rotor and said stator for a substantial part of the axial extensions thereof, and at least half of the axial longitudinal dimension of the stator winding and of the rotor magnet interacting magnetically therewith being housed within said outer peripheral cylindrical surface of the storage disk mounting portion of the hub, and*

*a magnetic shield ring located in the hub and extending substantially from the soft magnetic annular yoke radially inwardly and substantially from one axial end of the soft magnetic annular yoke.*

*52. A disk storage drive comprising:*

*a clean chamber for housing a storage disk;*

*a brushless drive motor having a stator and a winding on the stator, the stator having an axial longitudinal dimension;*

*an external rotor having a rotation axis and coaxially surrounding the stator, an inner wall of said rotor being spaced from said stator by a substantially cylindrical air gap, said rotor having a permanent magnet with an axial longitudinal dimension and a soft-magnetic annular yoke with an axially extending wall portion, said permanent magnet forming the inner wall of said rotor adjacent the air gap;*

*a hub held fast on the rotor for rotation therewith and being coaxial to the yoke, said hub having a machinable outer surface and being made of a non-corrodible material suitable for use in a clean chamber;*

*an outer peripheral cylindrical surface on said hub dimensioned to pass through a standarized central opening of a storage disk for receiving and mounting the storage disk for rotation therewith in said clean chamber, said outer peripheral cylindrical surface radially enclosing said soft magnetic annular yoke of said rotor and said stator for a substantial part of the axial extensions thereof; and*

*a magnetic shield ring located in the hub and extending substantially from one axial end of the soft magnetic annular yoke.*

*53. A disk storage drive as claimed in claim 52, wherein the stator winding and the rotor magnet interacting therewith are substantially completely housed within the disk mounting portion of the hub.*

*54. A disk storage drive as claimed in claim 52, wherein the hub is made of light metal.*

*55. A disk storage drive as claimed in claim 52, wherein the external circumferential surface of the disk mounting portion of the hub, after assembly of hub and drive motor, is finished with respect to centricity with the rotation axis.*

*56. A disk storage drive as claimed in claim 52, wherein the rotor and the hub are fixed to a rotatable shaft.*

*57. A disk storage drive as claimed in claim 52, wherein the rotor and the hub are fixed to a shaft rotatably supported axially in a bearing system that is at least partly housed within the stator of the drive motor.*

*58. A disk storage drive as claimed in claim 52, wherein a bearing bush receiving the shaft is formed integrally in the hub or soft magnetic annular yoke.*

*59. A disk storage drive as claimed in claim 58, wherein the bearing system is sealed by means of at least one magnetic fluid or ferrofluidic seal.*

*60. A disk storage drive as claimed in claim 59, wherein the magnetic field or ferrofluidic seal is positioned adjacent to but axially spaced from the bearing bush.*

*61. A disk storage drive as claimed in claim 52, wherein the rotor and the hub are rotatably mounted by means of a bearing system on a fixed shaft.*

*62. A disk storage drive as claimed in claim 61, wherein leads are provided for the stator winding that pass through the fixed shaft to the outside of the drive.*

*63. A disk storage drive as claimed in claim 52, wherein a control magnet is connected to the unit that includes the rotor and the hub, and interacts with a stationary magnetic position sensor.*

*64. A disk storage drive as claimed in claim 63, wherein the control magnet is positioned on that side of the unit that includes the rotor and the hub and that is open in the axial direction.*

*65. A disk storage drive as claimed in claim 63, wherein the control magnet is axially aligned with the rotor magnet.*

*66. A disk storage drive as claimed in claim 63, wherein the rotation position sensor is mounted on a printed circuit board that axially faces the side of the unit that includes the rotor and the hub and that is open in the axial direction.*

*67. A disk storage drive as claimed in claim 52, wherein the ratio of inner and outer diameters of the stator is at least 0.35.*

*68. A disk storage drive as claimed in claim 67, wherein said ratio is 0.4 to 0.7.*

*69. A disk storage drive as claimed in claim 52, wherein the ratio of axial length to external diameter of the stator does not exceed 1.*

* * * * *

UNITED STATES PATENT AND TRADEMARK OFFICE

CERTIFICATE OF CORRECTION

PATENT NO. : Re. 34,412
DATED : October 19, 1993
INVENTOR(S) : Dieter ELSAESSER et al.

It is certified that error appears in the above-indentified patent and that said Letters Patent is hereby corrected as shown below:

Claim 38, column 15, line 34, change "27" to -- 37 --.

Claim 58, column 18, line 9, change "52" to -- 57 --.

Signed and Sealed this

Seventeenth Day of December, 1996

*Attest:*

*Attesting Officer*

BRUCE LEHMAN

*Commissioner of Patents and Trademarks*